United States Patent
Batt et al.

(10) Patent No.: US 11,949,723 B1
(45) Date of Patent: Apr. 2, 2024

(54) MOVING PAGES OF A VIRTUAL WHITEBOARD TO BREAKOUT ROOMS ASSOCIATED WITH A VIDEO CONFERENCE

(71) Applicant: Zoom Video Communications, Inc., San Jose, CA (US)

(72) Inventors: Palmer Harold Batt, Seattle, WA (US); Ziyue Wang, Hefei (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/063,739

(22) Filed: Dec. 9, 2022

(51) Int. Cl.
    *H04L 65/401* (2022.01)
(52) U.S. Cl.
    CPC ............................... *H04L 65/4015* (2013.01)
(58) Field of Classification Search
    CPC .................................................. H04L 65/4015
    See application file for complete search history.

(56) References Cited

U.S. PATENT DOCUMENTS

| | | | | |
|---|---|---|---|---|
| 7,716,284 | B2 * | 5/2010 | Andersen | G06Q 10/10 709/200 |
| 8,982,177 | B2 | 3/2015 | Modai et al. | |
| 9,398,059 | B2 * | 7/2016 | Shepherd | H04L 12/1822 |
| 9,525,711 | B2 | 12/2016 | Ackerman et al. | |
| 10,572,135 | B1 * | 2/2020 | Fieldman | H04L 67/06 |
| 11,349,889 | B1 | 5/2022 | Ashkenazi et al. | |
| 2007/0299710 | A1 * | 12/2007 | Haveliwala | G06Q 10/10 705/7.19 |
| 2007/0300165 | A1 * | 12/2007 | Haveliwala | G06F 3/0482 715/810 |
| 2020/0219216 | A1 * | 7/2020 | Davis | H04L 12/1822 |
| 2021/0021440 | A1 | 1/2021 | Stuntebeck | |
| 2021/0373676 | A1 * | 12/2021 | Jorasch | G06Q 10/103 |
| 2022/0103566 | A1 * | 3/2022 | Faulkner | H04L 67/06 |
| 2023/0143579 | A1 * | 5/2023 | Asgekar | H04L 12/1822 348/14.09 |
| 2023/0161307 | A1 * | 5/2023 | Guerrero | G05B 15/02 700/90 |
| 2023/0199120 | A1 * | 6/2023 | Panchaksharaiah | H04L 65/1093 348/14.08 |
| 2023/0376878 | A1 * | 11/2023 | Safrata | G06Q 10/06393 |

FOREIGN PATENT DOCUMENTS

AU          2015218560 B2     6/2017

* cited by examiner

*Primary Examiner* — Dhairya A Patel
(74) *Attorney, Agent, or Firm* — Young Basile Hanlon & MacFarlane, P.C.

(57) ABSTRACT

A system may instantiate a virtual whiteboard during a video conference controlled by a host device. The whiteboard may include a first page configured to output first visual content and a second page configured to output second visual content to displays of participant devices connected to the video conference. The system may move the first page to a first breakout room associated with the video conference and the second page to a second breakout room associated with the video conference. Access to the first page within the first breakout room may be limited to a first group of one or more of the participant devices connected to the first breakout room and the host device. Access to the second page within the second breakout room may be limited to a second group of one or more of the participant devices connected to the second breakout room and the host device.

20 Claims, 10 Drawing Sheets

US 11,949,723 B1

MOVING PAGES OF A VIRTUAL WHITEBOARD TO BREAKOUT ROOMS ASSOCIATED WITH A VIDEO CONFERENCE

FIELD

This disclosure relates generally to video conferencing and, more specifically, to moving pages of a virtual whiteboard to breakout rooms associated with a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
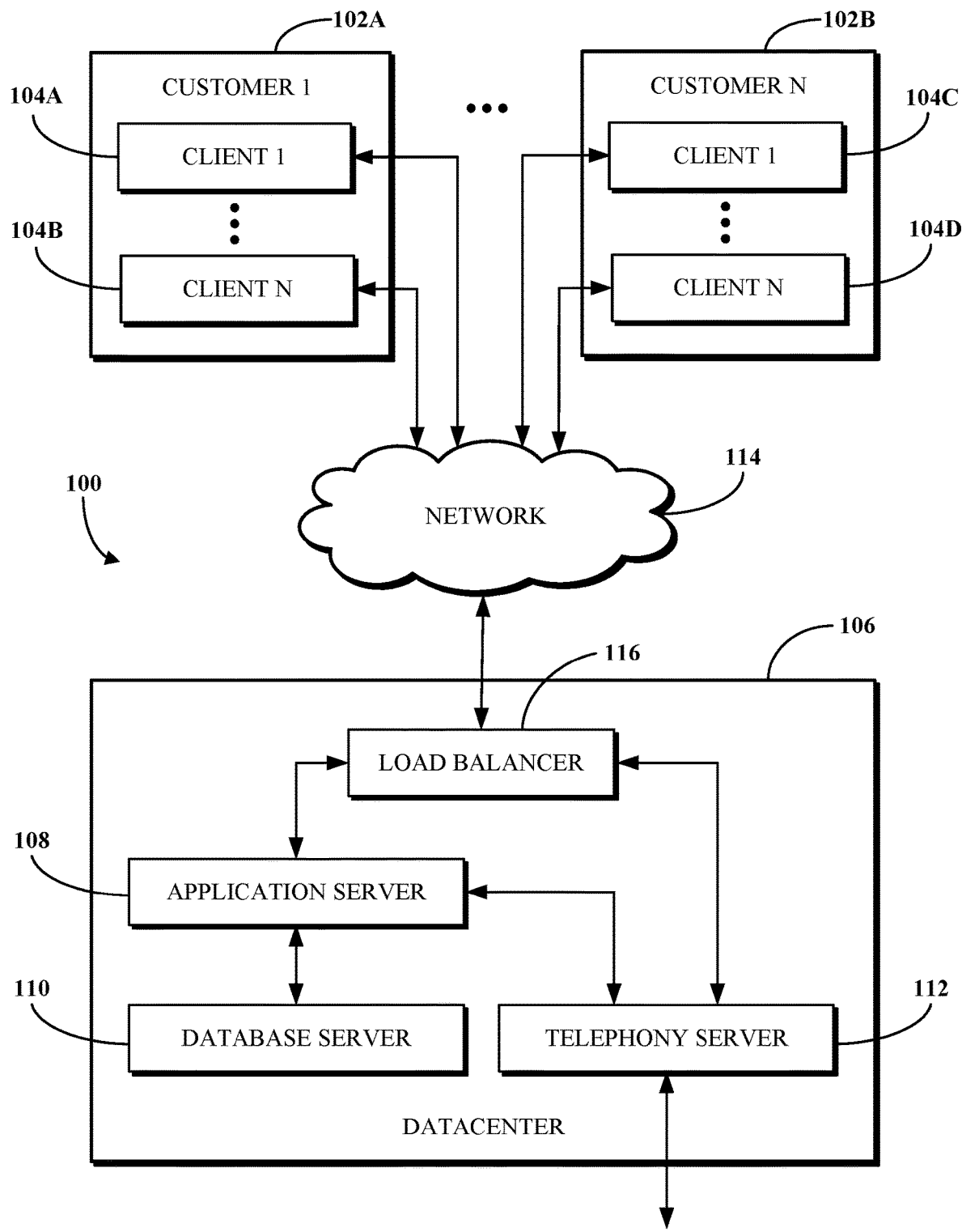
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Conferencing software, such as that of a conventional UCaaS platform, generally enables participants of a video conference to be moved into breakout rooms. A "breakout room" is a virtual meeting room that allows participants of a main meeting of a video conference to temporarily leave the main meeting and join a side meeting (e.g., breakout) of the video conference. A host can choose to split participants of the main meeting into these separate breakout rooms automatically or manually, or they can allow participants to select and enter breakout rooms on their own. Once the participants enter in the breakout rooms, they can use tools such as a virtual whiteboard to collaborate and share ideas. However, breakout rooms as enabled by conventional software are typically limited in the direction provided to participants in the breakout rooms. For example, when participants leave the main meeting for the breakout room, and are no longer with the host, the participants may have difficulty accomplishing the task they have been assigned because they are unclear about instructions that have been given to them, or what tools to use, or they do not know where to start. This may result in an inefficient use of time by the participants in the breakout rooms. Additionally, when the participants return from the breakout rooms to the main meeting to deliver the outcomes from the breakout rooms, an inefficient use of time in at least one breakout room can slow progress for the entire group in the main meeting. For example, when participants leave the main meeting and enter a breakout room, the participants might open a new, blank virtual whiteboard page and begin to add content. However, the participants might be unclear as to what content to add, and as a result, might be unprepared to bring desired content back to the entire group in the main meeting.

Implementations of this disclosure address problems such as these by enabling a host device connected to a video conference to selectively assign pages of an online, interactive, virtual whiteboard to breakout rooms associated with the video conference for guiding participants in the breakout rooms. A server device executing conferencing software can instantiate the whiteboard during a video conference. Multiple participant devices may be connected to the video conference, including a host device controlling the video conference. The whiteboard can include multiple pages, such as a first page configured to output first visual content and a second page configured to output second visual content to displays of the participant devices. For example, the host and/or the participants can use virtual tools, such as draw, shape, and line tools, text editors, sticky notes, templates, image tools, erasers, and table editors, including with specified fonts, sizes, colors, widths and emphasis where applicable, to generate the visual content. In some implementations, one or more of the pages may be populated with visual content before the video conference begins. The server device can instantiate breakout rooms, such as a first breakout room and a second breakout room, and move the pages to the breakout rooms, such as the first page to the first breakout room and the second page to the second breakout room, during the video conference. In some implementations, the pages can be moved to the breakout rooms automatically based on labels or manually by receiving input from the host device. In some implementations, one or more pages may be generated in a breakout room. In some implementations, one or more pages may be moved from one breakout room to another. When ending the breakout rooms (e.g., at the end of the breakout sessions, when breakout participants re-join the main meeting), the pages from the breakout rooms can be combined so that changes made to the visual content in the breakout rooms are propagated to the whiteboard in the main meeting. As a result, when participants leave a main meeting for a breakout room, the participants can be guided by select pages of the whiteboard to improve the efficiency of the participants toward accomplishing the task assigned to the breakout room.

To describe some implementations in greater detail, reference is first made to examples of hardware and software structures used to implement a system for moving pages of a virtual whiteboard to breakout rooms associated with a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
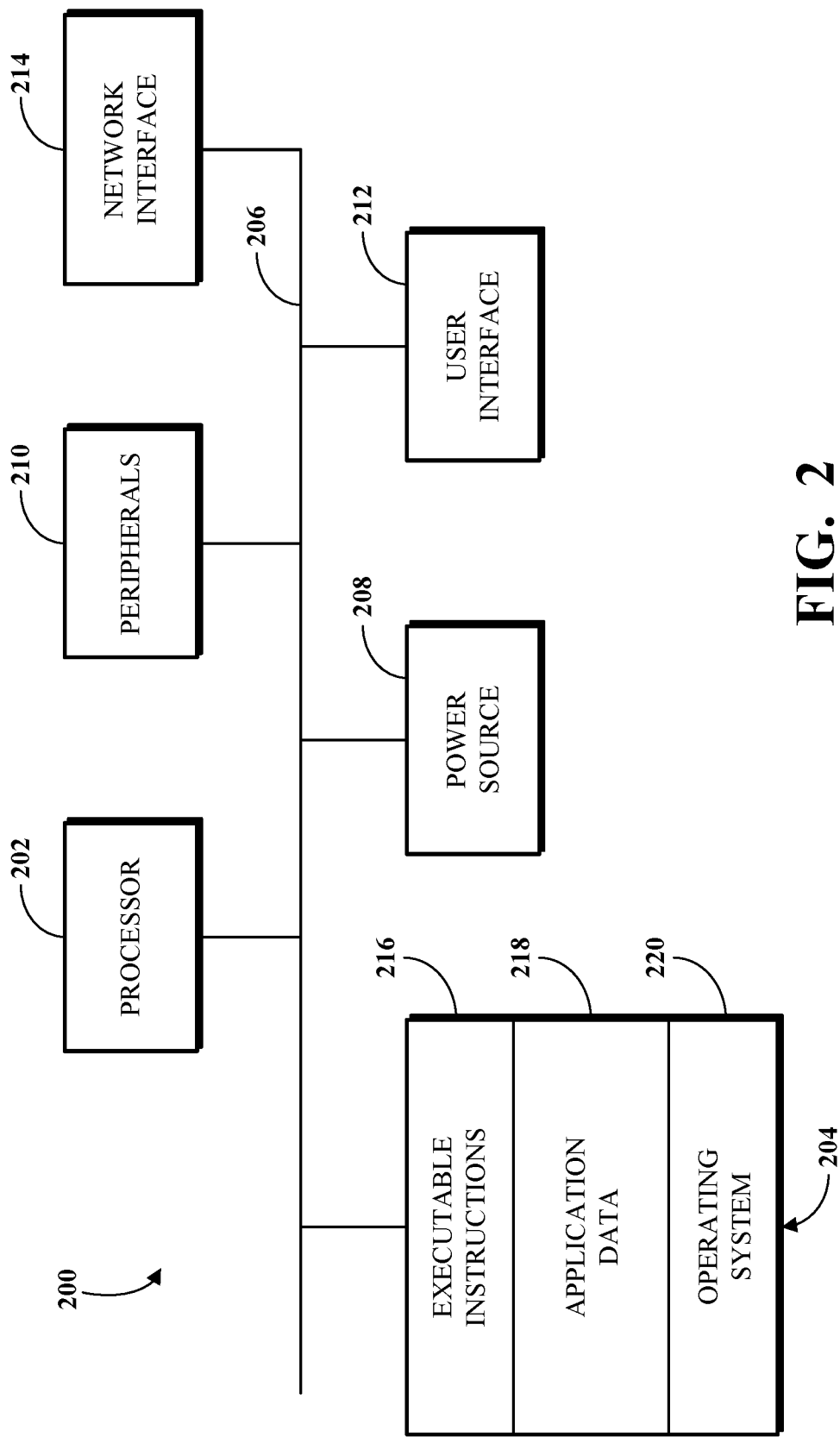
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
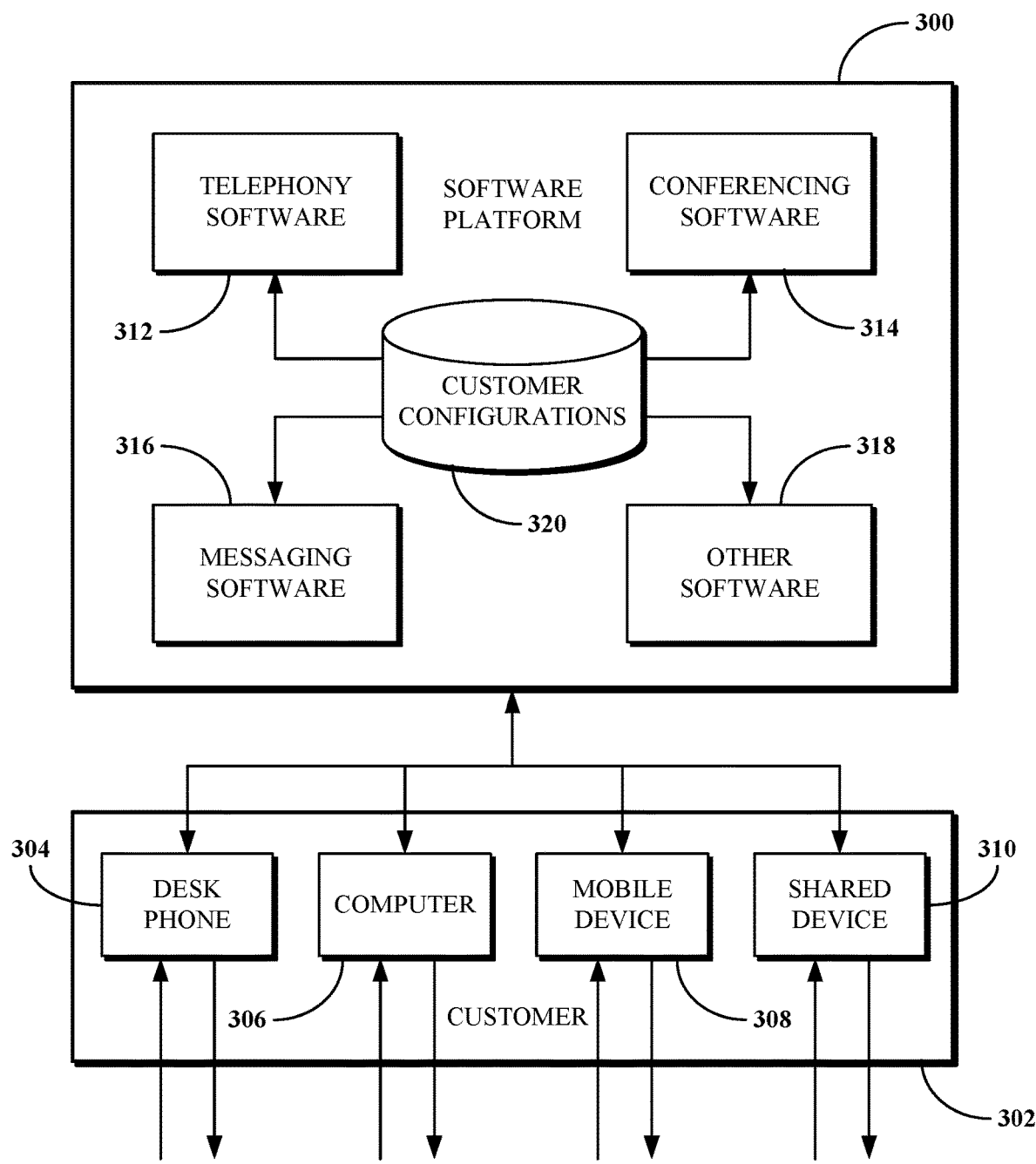
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include virtual whiteboard software, for example, software for moving pages of a virtual whiteboard to breakout rooms associated with a video conference. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
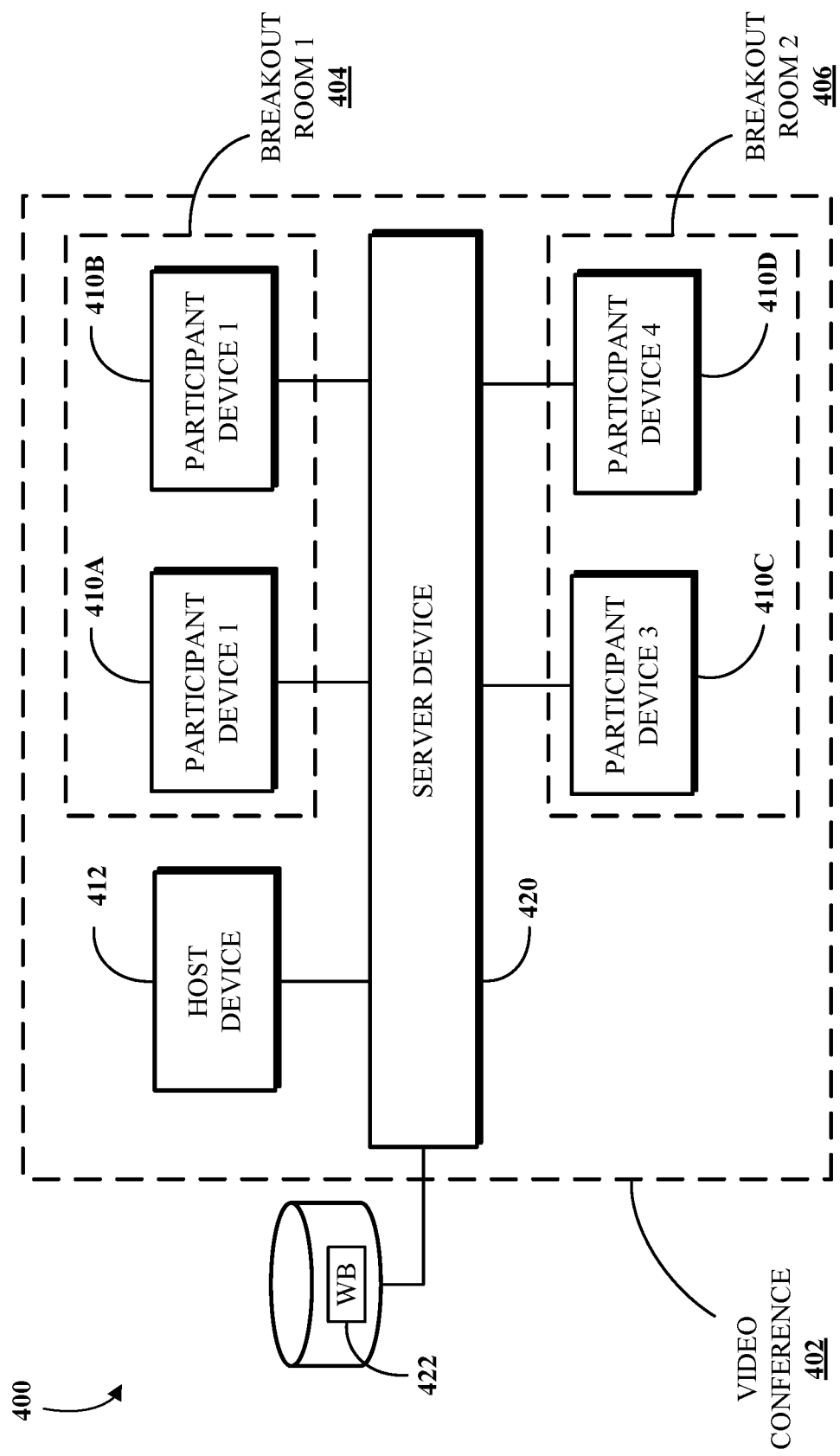
FIG. 4 is a block diagram of an example of a system for moving pages of a virtual whiteboard to breakout rooms associated with a video conference.

FIG. 4 is a block diagram of an example of a system 400 for moving pages of a virtual whiteboard 422 to breakout rooms associated with a video conference 402. The system 400 may include one or more participant devices that can be used by participants of the video conference 402, such as participant devices 410A to 410D. The system 400 may also include a host device that can be used by a host of the video conference 402, such as the host device 412. The participant devices 410A to 410D can access the video conference 402 (e.g., join as participants), and the host device 412 can control the video conference 402 (e.g., host the meeting). Each of the participant devices 410A to 410D and the host device 412 may be a client device such as one of the clients 104A through 104D shown in FIG. 1 or 304 through 310 shown in FIG. 3. Although four participant devices 410A to 410D are shown and described by example, other numbers of participant devices may be used with the system 400. A participant device such as the participant devices 410A to 410D or the host device 412 may execute software (e.g., client-side conferencing software, which could, for example, be via a client application or a web application used to connect to a conference implemented using server-side conferencing software, such as the conferencing software 314 shown in FIG. 3) and may connect to a server device 420. The server device 420 may execute software (e.g., server-side conferencing software, such as the conferencing software 314) to support the video conference 402 between participants using the participant devices 410A to 410D. For example, the server device 420 could be a server at the datacenter 106 shown in FIG. 1, such as the application server 108 or the telephony server 112.

The host device 410 can move the participants using the participant devices 410A to 410D from a main meeting room to one or more breakout rooms. The host device 410 can split the participants using the participant devices 410A to 410D (e.g., from the main meeting room) into these separate breakout rooms automatically or manually, or the host device 410 can allow the participants using the participant devices 410A to 410D to select and enter breakout rooms on their own. For example, the host device 410 can move the participants using the participant devices 410A and 410B into a first breakout room 404 and move the participants using the participant devices 410C and 410D into a second breakout room 406. Once the participants enter in the breakout rooms, they can use tools such as an online, interactive, virtual whiteboard 422 to collaborate and share ideas.

The host device 410 can selectively assign pages of the whiteboard 422 to the first breakout room 404 and the second breakout room 406 associated with the video conference 402. The host device 410 can assign the pages to the breakout rooms for guiding the participants using the participant devices 410A to 410D in the breakout rooms. For example, the host device 410 can control the server device 420, executing the conferencing software (e.g., the server-side conferencing software, such as the conferencing software 314), to instantiate the whiteboard 422 (e.g., via whiteboard software, such as the other software 318) during the video conference 402. The whiteboard 422 can include multiple pages, such as a first page configured to output first visual content and a second page configured to output second visual content to displays of the participant devices 410A to 410D. For example, the host and/or the participants can use virtual tools, such as draw, shape, and line tools, text editors, sticky notes, templates, image tools, erasers, and table editors, including with specified fonts, sizes, colors, widths and emphasis where applicable, to generate the visual content.

The host device 410 can control the server device 420 to instantiate the breakout rooms, such as the first breakout room 404 and the second breakout room 406. The host device 410 can assign participants to the breakout rooms, automatically or manually, such as the participants using the participant devices 410A and 410B assigned to the first breakout room 404, and the participants using the participant devices 410C and 410D assigned to the second breakout room 406. The host device 410 can selectively move the pages of the whiteboard 422 to the breakout rooms, such as the first page to the first breakout room 404 and the second page to the second breakout room 406, during the video conference 402. This may enable the participants using the participant devices 410A and 410B to use the first page when in the first breakout room 404, and the participants using the participant devices 410C and 410D to use the second page when in the second breakout room 406. For example, access to the first page in the first breakout room 404 may be limited to the participant devices that are connected to the first breakout room 404 in a first group (e.g., the participants using the participant devices 410A and 410B) and the host device 410. Access to the second page in the second breakout room 406 may be limited to the participant devices that are connected to the second breakout room 406 in a second group (e.g., the participants using the participant devices 410C and 410D) and the host device 410.

In the breakout rooms (e.g., the first breakout room 404 and the second breakout room 406), the participants using the participant devices (e.g., the participant devices 410A to 410D) can access the pages of the whiteboard 422 moved into their respective breakout rooms, such as by viewing and/or editing the visual content. For example, while in the breakout rooms, the participants using the participant devices 410A and 410B can access the first page moved into the first breakout room 404, but not the second page moved into the second breakout room 406. Similarly, while in the breakout rooms, the participants using the participant devices 410C and 410D can access the second page moved into the second breakout room 406, but not the first page moved into the first breakout room 404. Further, the participants joining the breakout rooms, via the participant devices being connected thereto, may communicate with one another in their respective breakout rooms, such as by speaking to one another using cameras and microphones, chatting with one another using keyboards and screens, and seeing video feeds of one another in user tiles using cameras and screens. For example, the participants using the participant devices 410A and 410B can communicate with one another in the first breakout room 404, but may not communicate with the participants using the participant devices 410C and 410D in the second breakout room 406. Similarly, the participants using the participant devices 410C and 410D can communicate with one another in the second breakout room 406, but may not communicate with the participants using the participant devices 410A and 410B in the first breakout room 404. As a result, when the participants using the participant devices 410A to 410D leave the main meeting for a breakout room, the participants can be guided by the select pages of the whiteboard 422 to improve their efficiency in the breakout rooms.

The host can join a breakout room (e.g., the first breakout room 404 or the second breakout room 406) as another participant, with the host device 410 being connected thereto, or can remain in the main meeting room and not join the breakout room. When the host remains in the main meeting room, the participants do not see the host as a participant in their breakout rooms. However, the host using the host device 410 can still access the pages in the breakout rooms, such as by viewing and/or editing the visual contents. For example, the host using the host device 410 can access the first page in the first breakout room 404, and the second page in the second breakout room 406, without joining either the first breakout room 404 or the second breakout room 406 as a participant.

When ending the first breakout room 404 and/or the second breakout room 406 (e.g., at the end of the breakout sessions, when the participants using the participant devices 410A to 410D re-connect to the main meeting of the video conference 402, such as when side video conferences associated with the breakout rooms have closed or terminated, so that the participant devices 410A to 410D can no longer connect to them), the pages from the breakout rooms can be combined in the main meeting. This may enable changes made to the visual content, in the breakout rooms, to be propagated to the whiteboard 422 in the main meeting.

Figure 5:
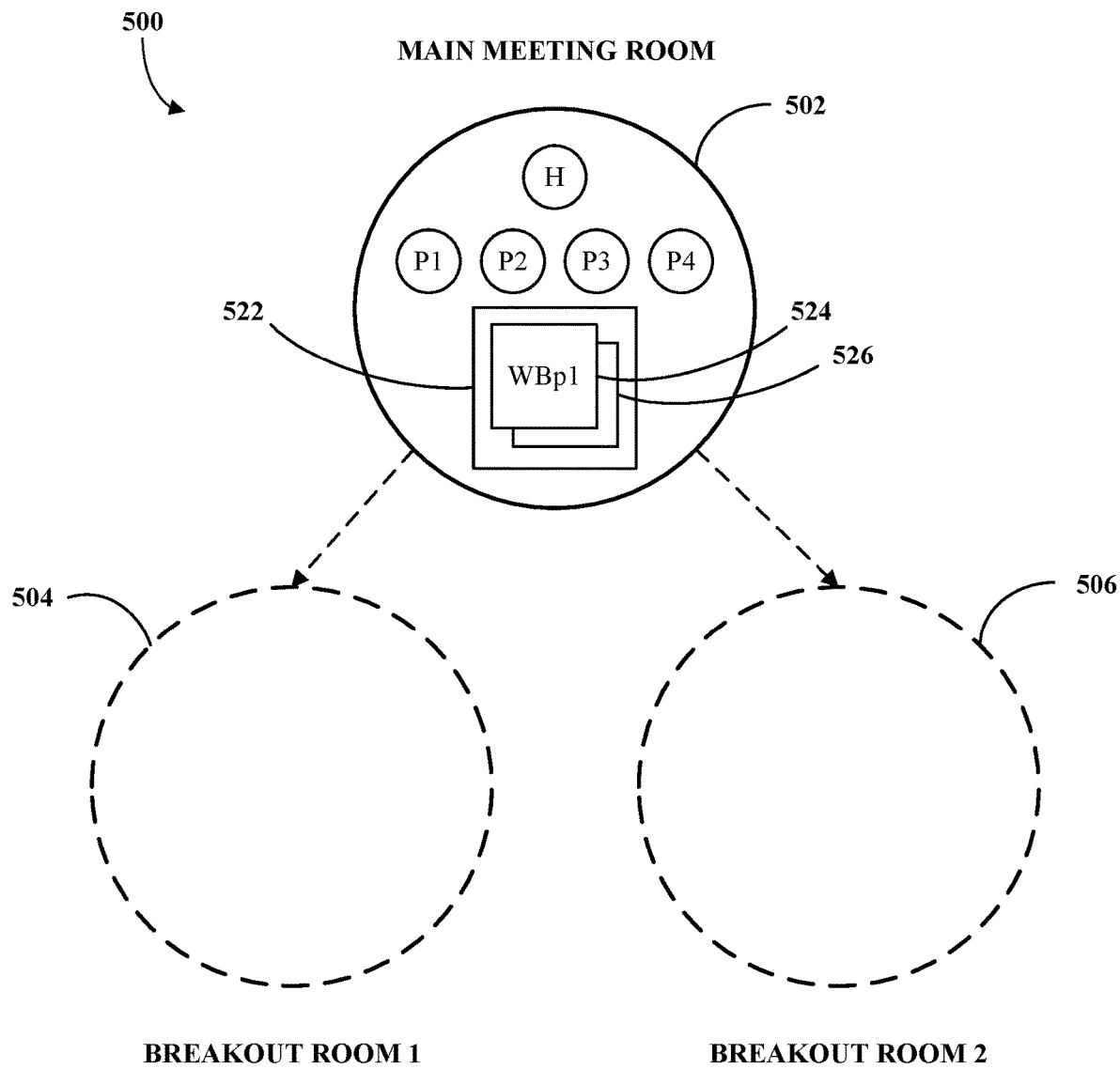
FIG. 5 is a block diagram of an example of a system in which a whiteboard is instantiated during a video conference controlled by a host device.

FIG. 5 is a block diagram of an example of a system 500 in which a whiteboard 522 is instantiated during a video conference controlled by a host device. The system 500 can be executed using computing devices, such as the systems, hardware, and software described with respect to FIGS. 1-4. For example, the whiteboard 522 could be the whiteboard 422 shown in FIG. 4. In the system 500, a host using the host device (e.g., the host device 412, shown in FIG. 5 as "H") can instantiate a main meeting room and multiple breakout rooms associated with the main meeting room, such as a main meeting room 502, a first breakout room 504, and a second breakout room 506. Each instantiated room may include a session identifier or address that allows conferencing software, such as the conferencing software 314, to organize the rooms, individually or in groups, and to associate or link the breakout rooms as sub-rooms to the main meeting room 502. Initially, the host can join the main meeting room 502 and admit participants (e.g., the participants using the participant devices 410A to 410D, shown in FIG. 5 as "P1," "P2," "P3," and "P4," respectively) to join the main meeting room 502. For example, the host could be a teacher and the participants could be students in a virtual classroom, or the host could be an administrator and the participants could be collaborators in a virtual conference room. The participants, including the host, may communicate with one another in the main meeting room 502 with the host controlling the video conference.

The whiteboard 522 may include one or more pages, such as a first page 524 and a second page 526. Each page may include a page identifier that allows the whiteboard software (e.g., the other software 318) to organize the pages and to associate or link the pages as sub-whiteboards to the whiteboard 522. The pages may be configured to output visual content to displays of the host device and the participant devices connected to the video conference. For example, the first page 524 may be configured to output first visual content (e.g., shown as WBp1 in FIG. 5), and the second page 526 may be configured to output second visual content (e.g., shown as WBp2 in FIG. 5). This may enable the participants to communicate with one another via virtual whiteboarding. In some implementations, one or more of the pages may be populated with visual content before the video conference begins. For example, the host can prepare the first visual content associated with the first page 524 and/or the second visual content associated with the second page 526 in advance of the video conference (e.g., before the host and the participants join the video conference). The host can then load the first page 524 with the first visual content, and/or the second page 526 with the second visual content, during the video conference. This may enable the host to save time by creating the pages with the visual content before the video conference begins.

Figure 6:
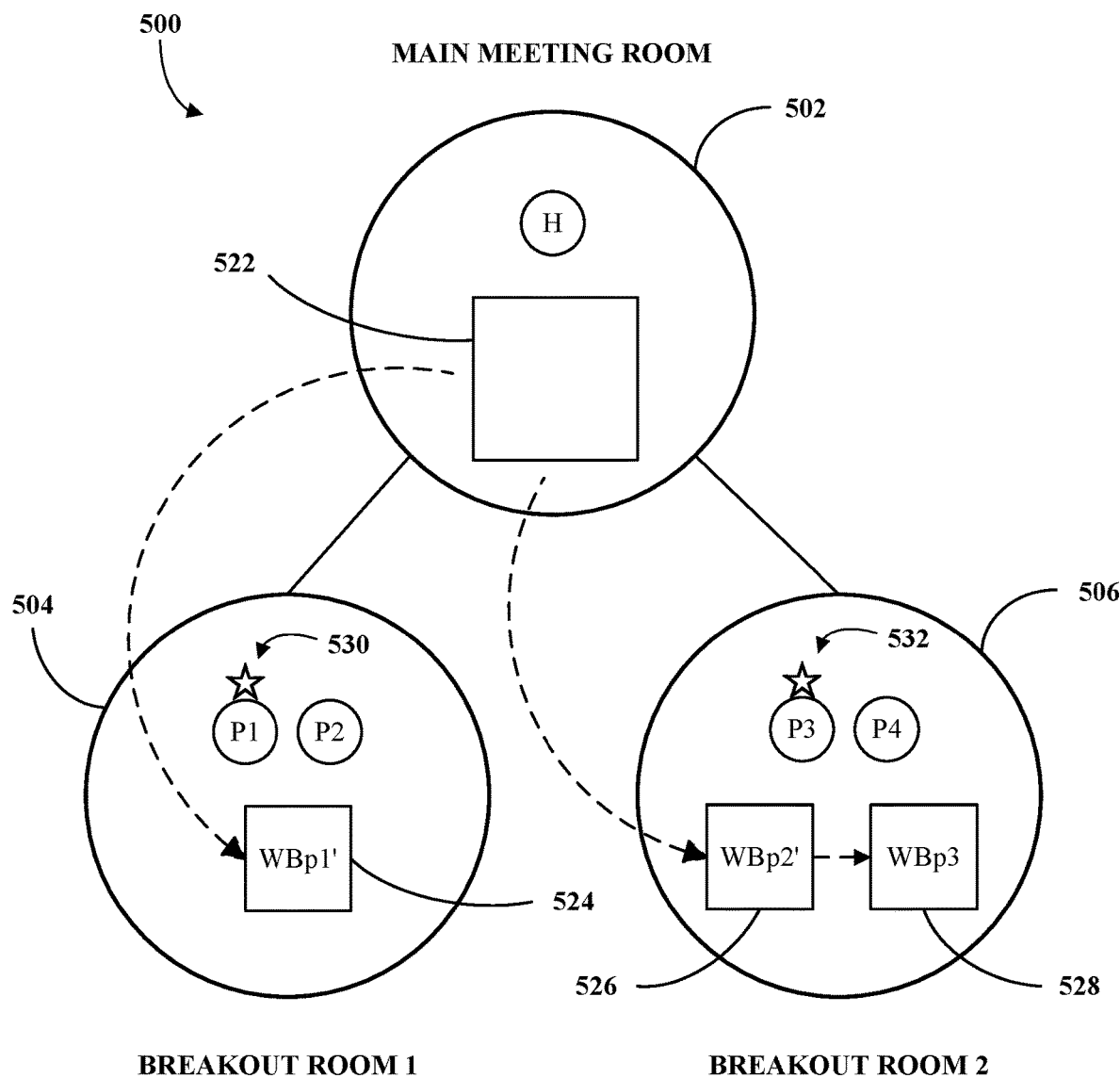
FIG. 6 is a block diagram of an example of a system in which pages of a whiteboard are moved to breakout rooms associated with a video conference.

FIG. 6 is a block diagram of an example of the system 500 in which pages of the whiteboard 522 are moved to the breakout rooms associated with the video conference. For example, the host device can selectively assign the first page 524 to the first breakout room 504 and the second page to the second breakout room 506, causing the first page 524 to move to the first breakout room 504 and the second page to move to the second breakout room 506. In some implementations, the host may provide input, via the host device, to assign the pages to the breakout rooms. For example, the host may select, through a GUI, an assignment of the first page 524 to the first breakout room 504, and the second page 526 to the second breakout room 506. In some implementations, the pages may be automatically assigned to the breakout rooms. For example, in one case, the first page 524 may be randomly assigned to the first breakout room 504, and the second page 526 may be randomly assigned to the second breakout room 506, by the whiteboard software (e.g., the other software 318). In some implementations, the pages may be assigned to the breakout rooms based on labels corresponding to the pages. For example, the first page 524 could have a first label (e.g., "math_problem"), the second page 526 could have a second label (e.g., "science_problem"), the first breakout room 504 could have a third label (e.g., "math_breakout_session"), and the second breakout room 506 could have a fourth label (e.g., "science_breakout_session"). The first page 524 may be assigned to the first breakout room 504 based on a match between the first label and the third label (e.g., "math"), and the second page 526 may be assigned to the second breakout room 506 based on a match between the second label and the fourth label (e.g., "science").

The participants (e.g., P1 to P4) may also be moved to the breakout rooms associated with the video conference. For example, the host device can selectively assign P1 and P2 (e.g., a first group) to the first breakout room 504 and P3 and P4 (e.g., a second group) to the second breakout room 506, causing P1 and P2 to move to the first breakout room 504 and P3 and P4 to move to the second breakout room 506. In some implementations, the host may provide input, via the host device, to assign the participants to the breakout rooms. For example, the host may select, through the GUI, an assignment of P1 and P2 to the first breakout room 504, and P3 and P4 to the second breakout room 506. In some implementations, the participants may manually move to the breakout rooms. For example, P1 and P2 may individually select to leave the main meeting room 502 and join the first breakout room 504, and P3 and P4 may individually select to leave the main meeting room 502 and join the second breakout room 506. In some implementations, the participants may be automatically assigned to the breakout rooms. For example, in one case, P1 and P2 may be randomly assigned to the first breakout room 504, and P3 and P4 may be randomly assigned to the second breakout room 506, by the conferencing software (e.g., the conferencing software 314). In another case, the participants may be assigned to the breakout rooms based on labels corresponding to the participants (e.g., names). For example, P1 and P2 may be assigned to the first breakout room 504 based on an earlier alphabetical order of their names, and P3 and P4 may be assigned to the second breakout room 506 based on a later alphabetical order of their names. In some implementations, the participants may be linked to the pages of the whiteboard 522, such as by corresponding labels, and the participants may be assigned to the breakout rooms based on assigning the pages to the breakout rooms. For example, P1 and P2 may be linked to the first page 524, and the P3 and P4 may be linked to the second page 526. Moving the first page 524 to the first breakout room 504 may cause P1 and P2 to be assigned to the first breakout room 504, and moving the second page 526 to the second breakout room 506 may cause P3 and P4 to be assigned to the second breakout room 506.

In the breakout rooms (e.g., the first breakout room 504 and the second breakout room 506), the participants using the participant devices (e.g., P1 to P4) can access the pages of the whiteboard 522 moved into their respective breakout rooms, such as by viewing and/or editing the visual content.

For example, P1 and P2 can access the first page 524 moved into the first breakout room 504, but not the second page 526 moved into the second breakout room 506. Similarly, P3 and P4 can access the second page 526 moved into the second breakout room 506, but not the first page 524 moved into the first breakout room 504. The participants can use virtual tools, such as draw, shape, and line tools, text editors, sticky notes, templates, image tools, erasers, and table editors, including with specified fonts, sizes, colors, widths and emphasis where applicable, to edit the visual content. The host can join a breakout room as another participant, or can remain in the main meeting room 502 and not join the breakout room as shown in FIG. 6. When the host remains in the main meeting room 502, the participants do not see the host as a participant in their breakout rooms. However, the host can still access the pages in the breakout rooms, such as by viewing and/or editing the visual contents. For example, the host can access the first page 524 in the first breakout room 504, and the second page 526 in the second breakout room 506, without joining either the first breakout room 504 or the second breakout room 506 as a participant.

In some implementations, the level of access by the participants to the pages in the breakout rooms may be limited. For example, access to the first page 524 by the first group, including P1 and P2, may be limited to view access (e.g., the participants in the first group may only view the first visual content), while access to the second page 526 by the second group, including P3 and P4, may include edit access (e.g., the participants in the second group may edit the second visual content). In some implementations, one or more of the participants in a group may be given greater access to the visual content (e.g., edit access) than other participants in the group (e.g., restricted to view access). For example, in the first group, P1 may be designed as a sub-host using a sub-host device 530, and may therefore be given greater access (e.g., edit access) than P2 (e.g., restricted to view access). In the second group, P3 may be designed as a sub-host using a sub-host device 532, and may therefore be given greater access (e.g., edit access) than P4 (e.g., restricted to view access). A participant may be assigned as a sub-host manually (e.g., the host may provide input, via the host device) or automatically (e.g., randomly by the whiteboard software, or based on labels).

Figure 7:
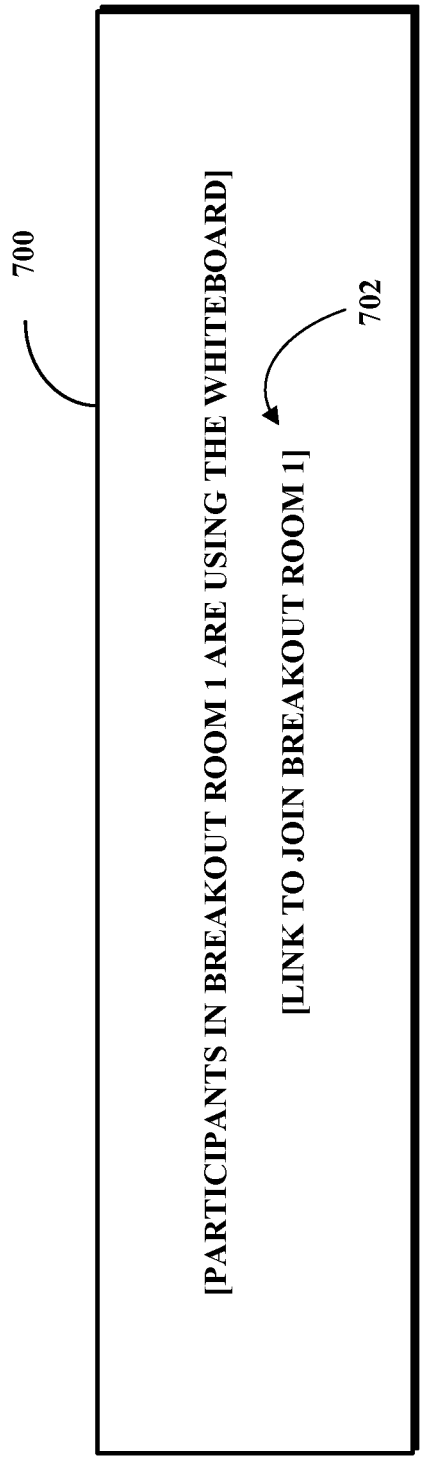
FIG. 7 is an illustration of an example of a graphical user interface (GUI) including a notification that a page of a whiteboard is being used in a breakout room.

In the breakout rooms, the participants may edit the pages of the whiteboard 522 based on the access that is given. For example, P1 and/or P2 may edit the first page 524 to change the first visual content (e.g., shown as WBp1 in FIG. 5) in the first breakout room 504, and P3 and/or P4 may edit the second page 526 to change the second visual content (e.g., WBp2 in FIG. 5) in the second breakout room 506. The host can access the pages in the breakout rooms, including by viewing the changes to the visual content made by the participants, from the main meeting room 502 (e.g., without joining a breakout room). In some implementations, when a participant accesses a page in a breakout room (e.g., viewing or editing), a notification may be transmitted to the host via the host device, indicating such access. For example, with additional reference to FIG. 7, a GUI 700 could be displayed to the host device. The GUI 700 may include a notification that a page of a whiteboard (e.g., the first page 524) is being used in a breakout room (e.g., P1 or P2 accessing the first page 524). The notification may include a link 702 to enable the host to join the breakout room that is accessing the page (e.g., the link may enable the host device to connect to the breakout room using the page, such as the first breakout room 504).

In some implementations, one or more pages may be moved from one breakout room to another. For example, the first page 524 could be moved from the first breakout room 504 to the second breakout room 506, and the second page 526 could be moved from the second breakout room 506 to the first breakout room 504. The pages could be moved between the breakout rooms by the host device or by a participant device (e.g., when a level of access associated with the participant device enables such movement). In some implementations, the one or more pages may be moved from one breakout room to another automatically, such as moving the pages based on the expiration of a timer.

Figure 8:
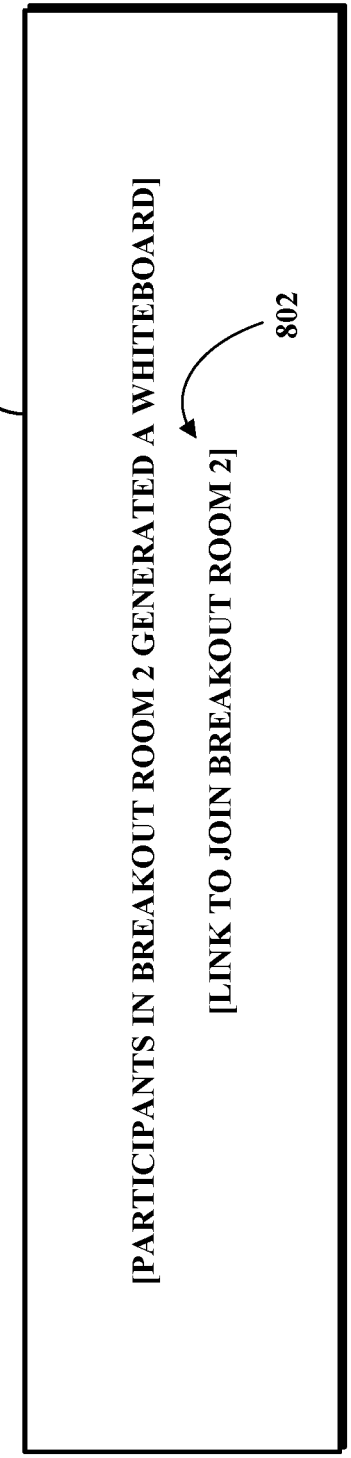
FIG. 8 is an illustration of an example of a GUI including a notification that a page of a whiteboard has been generated in a breakout room.

Referring again to FIG. 6, in some implementations, participants in a breakout room, or the host in the main meeting room 502, may instantiate a new page in a breakout room or the main meeting room 502. The new page may include a page identifier that allows the whiteboard software (e.g., the other software 318) to organize the page and to associate or link the page as a sub-whiteboard to the whiteboard 522. For example, P3 or P4 in the second breakout room 506, or the host in the main meeting room 502, may instantiate a third page 528 in the second breakout room. The third page 528 may be linked to the whiteboard 522 by linking to the second page 526. In some implementations, when a participant instantiates a new page in a breakout room, a notification may be transmitted to the host via, the host device, indicating such instantiation. For example, with additional reference to FIG. 8, a GUI 800 could be displayed to the host device. The GUI 800 may include a notification that a page of a whiteboard (e.g., the first page 524) has been generated in a breakout room. The notification may include a link 802 to enable the host to join the breakout room that generated the page (e.g., the link may enable the host device to connect to the breakout room that instantiated the page, such as the second breakout room 506).

Figure 9:
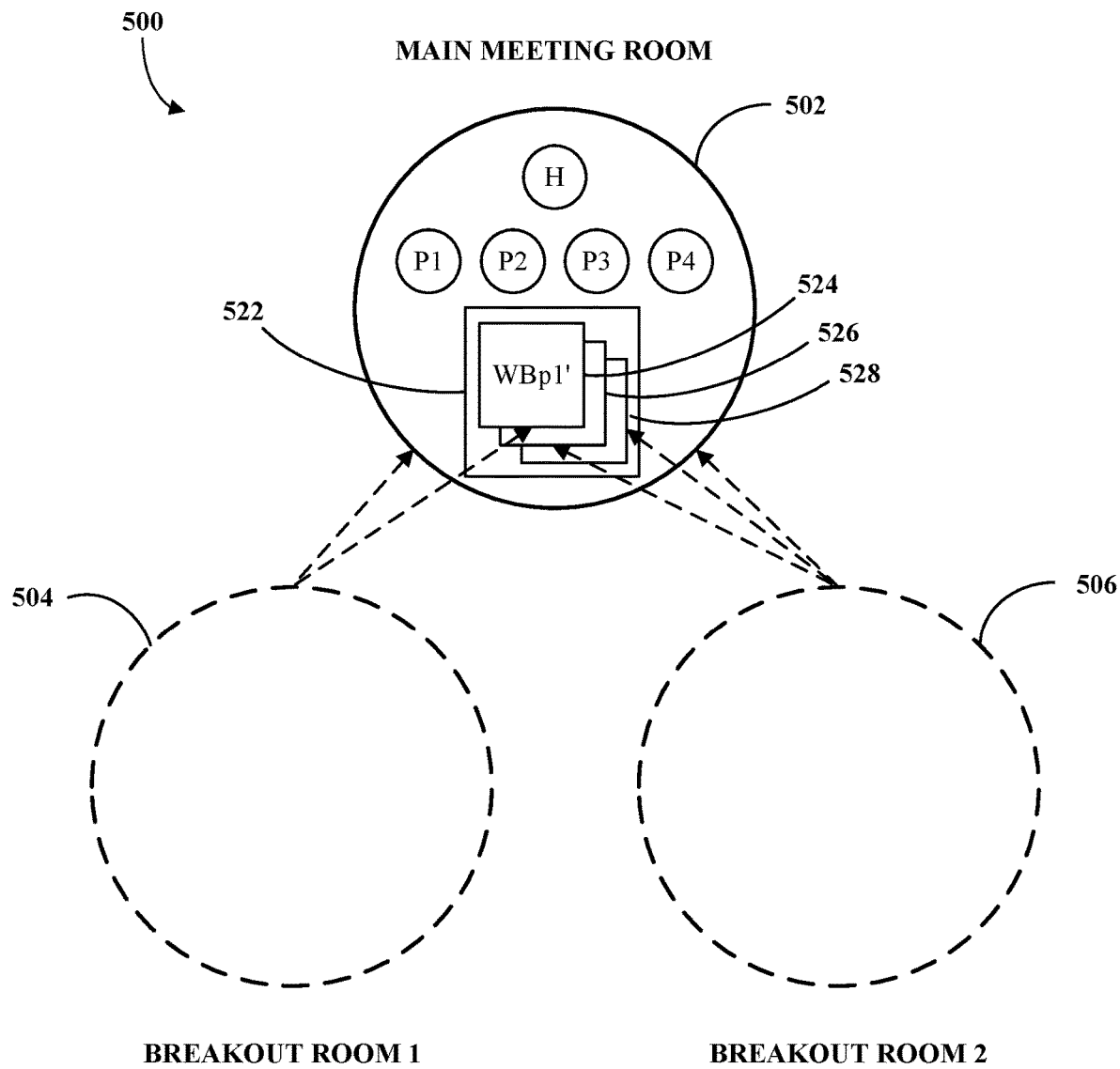
FIG. 9 is a block diagram of an example of a system in which pages of a whiteboard are combined in a main meeting room.

FIG. 9 is a block diagram of an example of the system 500 in which pages of the whiteboard 522 are combined in the main meeting room 502 (e.g., merged). For example, when ending the breakout rooms (e.g., the first breakout room 504 and the second breakout room 506, ending at the end of the breakout sessions, such as when P1 to P4 re-join the main meeting room 502, and side video conferences associated with the first breakout room 504 and the second breakout room 506 have closed or terminated), the pages from the breakout rooms (e.g., the first page 524, the second page 526, and the third page 528) can be combined in the whiteboard 522 in the main meeting room 502. Further, the pages can be combined in the whiteboard 522 so that changes made to the visual content in the breakout rooms (e.g., the first visual content associated with the first page 524, the second visual content associated with the second page 526, and a third visual content associated with the third page 528) are propagated to the whiteboard 522.

In some implementations, a page from a breakout room may be combined in the main meeting room 502 when the page is closed in the breakout room, including when the breakout room remains open. For example, the first page 524 from the first breakout room 504 may be combined in the main meeting room 502 when the first page 524 is closed in the first breakout room 504, including when the first breakout room 504 remains open, and one or more participants (e.g., P1 or P2) remain in the first breakout room 504. In some implementations, a page from a breakout room may be combined in the main meeting room 502 when the page is saved in the breakout room, including when the page remains open and in use in the breakout room. For example, the first page 524 from the first breakout room 504 may be combined in the main meeting room 502 when the first page 524 is saved by a participant (e.g., P1 or P2) in the first breakout room 504. In some implementations, a page from a breakout room may be combined in the main meeting room 502 when the breakout room is closed, including when another breakout room remains open. For example, the first page 524 from the first breakout room 504 may be combined in the main meeting room 502 when the first breakout room 504 is closed, including when the second breakout room 506 remains open. In some implementations, a page from a breakout room may be combined in the main meeting room 502 when all pages in breakout rooms, and/or all breakout rooms, have closed. For example, the first page 524 from the first breakout room 504 may be combined in the main meeting room 502 when the first page 524 and the second page 526 have closed, and/or when the first breakout room 504 and the second breakout room 506 have closed.

Figure 10:
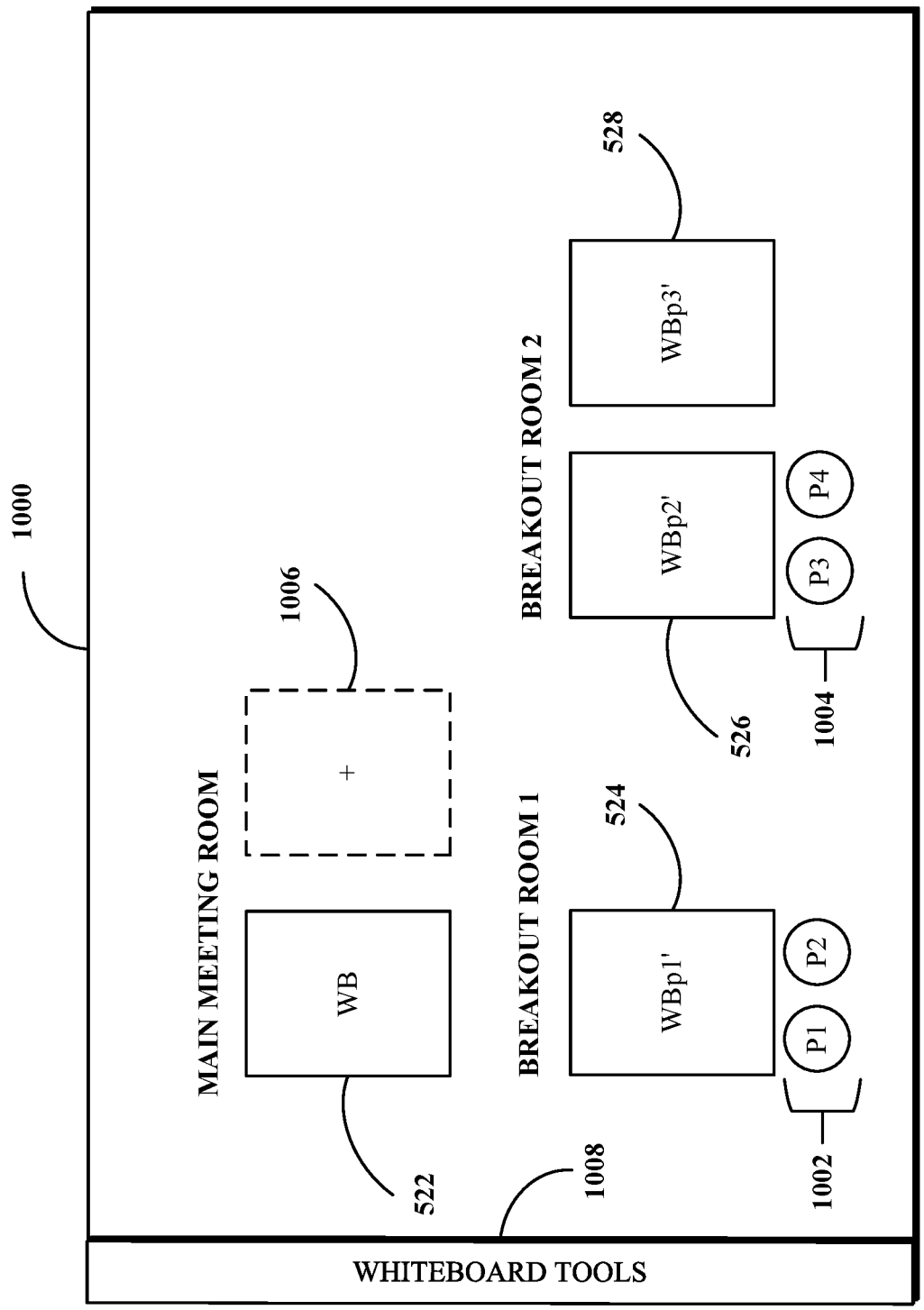
FIG. 10 is an illustration of an example of a GUI for managing pages of a whiteboard moved to breakout rooms.

FIG. 10 is an illustration of an example of a GUI 1000 for managing pages of the whiteboard 522 moved to breakout rooms. For example, the GUI 1000 could be output to a display of a host device (e.g., the host device 412) connected to the video conference (e.g., the video conference 402). The host, using the host device, can use the GUI 1000 to access pages moved to the breakout rooms, such as the first page 524 moved to the first breakout room 504 and the second page 526 moved to the second breakout room 506. The host, using the host device, can also use the GUI 1000 to access pages instantiated in breakout rooms, such as the third page 528 moved instantiated in the second breakout room 506. This may enable the host to access the pages in the breakout rooms without joining a breakout room (e.g., from a main meeting room, such as the main meeting room 502). For example, through the GUI 1000, the host can identify the first page 524 moved to the first breakout room 504, the second page 526 moved to the second breakout room 506, and the third page 528 instantiated in the second breakout room 506. Also, through the GUI 1000, the host may view changes to the visual content associated with the pages, made by the participants in the breakout rooms, such as changes to the first visual content (e.g., shown as WBp1' in FIG. 10) in the first breakout room 504, and changes to the second visual content (e.g., shown as WBp2' in FIG. 10) in the second breakout room 506.

The GUI 1000 may include breakout participant indicators indicating the participants in the breakout rooms, such as a first breakout participant indicator 1002 and a second breakout participant indicator 1004. For example, through the GUI 1000, and the first breakout participant indicator 1002, the host can identify P1 and P2 in the first breakout room 504. Through the GUI 1000 and the second breakout participant indicator 1004, the host can identify P3 and P4 in the second breakout room 506.

The GUI 1000 may include a new page selection 1006 for instantiating a new page of the whiteboard 522. Once instantiated, the host can populate the new page with visual content, such as by using whiteboard tools 1008. For example, the whiteboard tools 1008 may include virtual tools, such as draw, shape, and line tools, text editors, sticky notes, templates, image tools, erasers, and table editors, including with specified fonts, sizes, colors, widths and emphasis where applicable, to generate the visual content. The new page can be assigned and moved to a breakout room (e.g., the first breakout room 504 and/or the second breakout room 506), like the first page 524 moved to the first breakout room 504 and the second page 526 moved to the second breakout room 506.

In some implementations, the GUI 1000 may enable the host to populate one or more pages with visual content before the video conference begins. For example, in advance of the video conference (e.g., before the host and the participants join the video conference), the host can use the new page selection 1006 to instantiate new pages, and use the whiteboard tools 1008 to generate visual content associated with the pages. For example, the pages could be the first page 524 and the second page 526. The host can then load the pages with the first visual content during the video conference. This may enable the host to save time by creating the pages with the visual content before the video conference begins.

Figure 11:
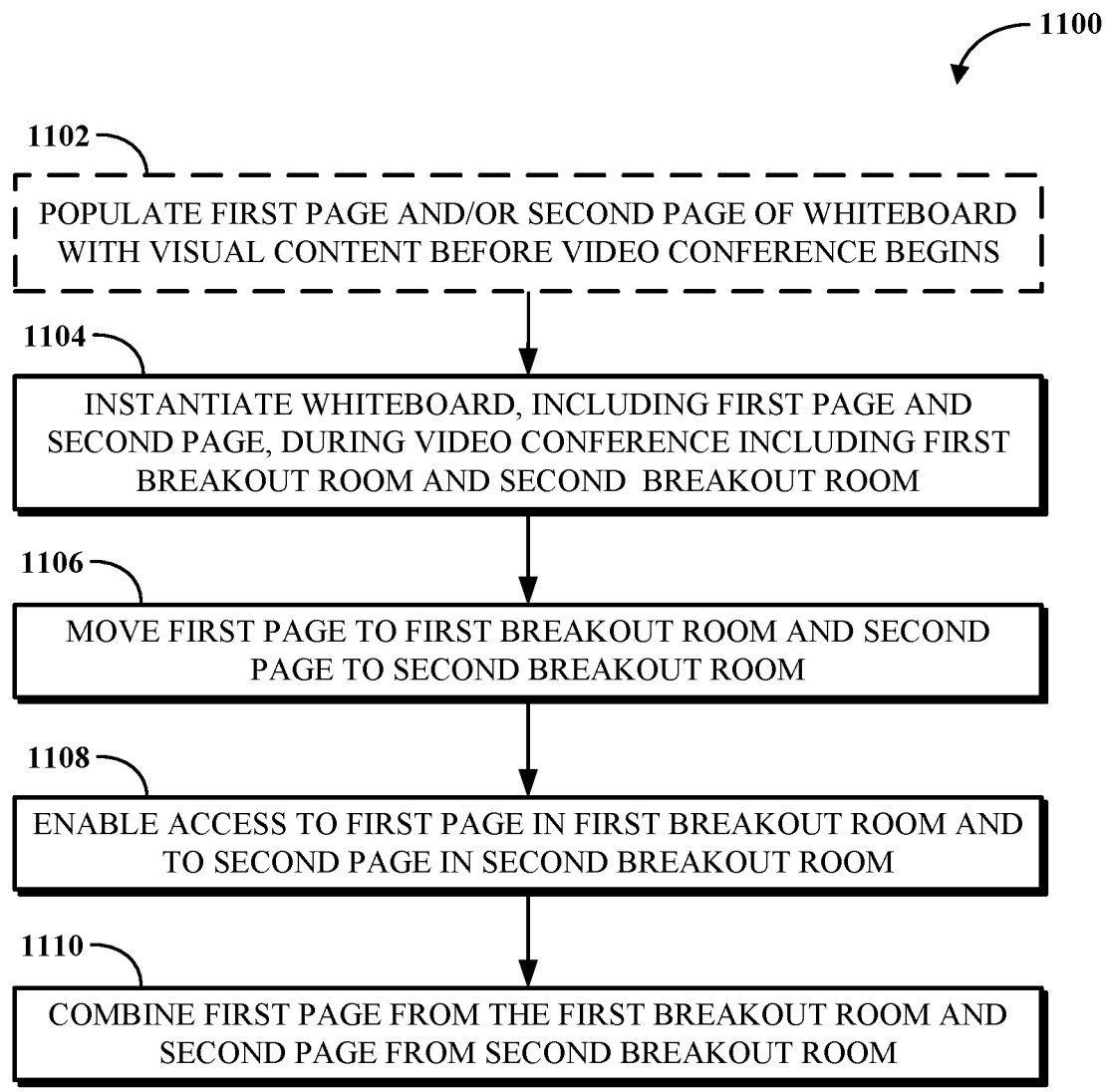
FIG. 11 is a flowchart of an example of a technique for moving pages of a virtual whiteboard to breakout rooms associated with a video conference.

To further describe some implementations in greater detail, reference is next made to examples of techniques which may be performed by or using a system for moving pages of a virtual whiteboard to breakout rooms associated with a video conference. FIG. 11 is a flowchart of an example of a technique 1100 for moving pages of a virtual whiteboard. The technique 1100 can be executed using computing devices, such as the systems, hardware, and software described with respect to FIGS. 1-10. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At an optional step 1102, a device (e.g., the host device 412, connected to the server device 420), may populate a first page (e.g., the first page 524) with first visual content and/or a second page (e.g., the second page 526) with second visual content before a video conference (e.g., the video conference 402) begins. The first page and the second page may be associated with a digital whiteboard (e.g., the whiteboard 422 or the whiteboard 522). For example, a host can prepare the first visual content associated with the first page and/or the second visual content associated with the second page in advance of the video conference. The host could use the GUI 1000 to populate the first page with the first visual content and/or populate the second page with the second visual content, such as by using whiteboard tools (e.g., the whiteboard tools 1008).

At 1104, the device may instantiate the whiteboard, including the first page and the second page, during a video conference controlled by the host device. For example, the device may receive the first page populated with the first visual content and/or the second page populated with the second visual content when populated before the video conference begins at step 1102. The video conference may include a first breakout room (e.g., the first breakout room 404, or the first breakout room 504) and a second breakout room (e.g., the second breakout room 406, or the second breakout room 506). The host can load the first page with the first visual content, and/or the second page with the second visual content, from step 1102 if already prepared. Alternatively, the host can prepare the first visual content associated with the first page and the second visual content associated with the second page following instantiation of the whiteboard and the pages during the video conference. The first page may be configured to output the first visual content and the second page may be configured to output second visual content to displays of participant devices connected to the video conference.

At 1106, the device may move the first page to the first breakout room associated with the video conference and move the second page to the second breakout room associated with the video conference. In some implementations, the pages may be automatically assigned to the breakout rooms. For example, in one case, the first page may be randomly assigned to the first breakout room, and the second page may be randomly assigned to the second breakout room, by the whiteboard software (e.g., the other software 318). In some implementations, the pages may be assigned to the breakout rooms based on labels corresponding to the pages. For example, the first page could have a first label, the second page could have a second label, the first breakout room could have a third label, and the second breakout room could have a fourth label. The first page may be assigned to the first breakout room based on a match between the first label and the third label, and the second page may be assigned to the second breakout room based on a match between the second label and the fourth label.

At 1108, the device may enable a first group of participants (e.g., the participants using the participant devices 410A and 410B, or P1 and P2) in the first breakout room, and the host, to access the first page moved to the first breakout room, and may enable a second group of participants (e.g., the participants using the participant devices 410C and 410D, or P3 and P4) in the second breakout room, and the host, to access the second page moved to the second breakout room. Access to the first page (e.g., the first page 524) within the first breakout room (e.g., the first breakout room 404, or the first breakout room 504) may be limited to the first group of the participant devices (e.g., the participant devices 410A and 410B) connected to the first breakout room, and the host device, and access to the second page (e.g., the second page 526) within the second breakout room (e.g., the second breakout room 406, or the second breakout room 506) may be limited to the second group of participant devices (e.g., the participant devices 410C and 410D) connected to the second breakout room, and the host device (e.g., the host device 412). After the first page is moved to the first breakout room and the second page is moved to the second breakout room, the host device may access the first page within the video conference without connecting to the first breakout room (e.g., without the host joining the first breakout room) and access the second page within the video conference without connecting to the second breakout room (e.g., without the host joining the second breakout room).

At 1110, the device may combine the first page from the first breakout room with the second page from the second breakout room. For example, the first page and the second page may be combined when the first breakout room and the second breakout room end (e.g., at the end of the breakout sessions, such as when the participants re-join the main meeting room, and the participants device re-connect thereto). The pages can be combined in the whiteboard so that changes made to the visual content in the breakout rooms (e.g., the first visual content associated with the first page, the second visual content associated with the second page, and a third visual content associated with the third page) are propagated to the whiteboard.

Some implementations may include a method that includes: instantiating a virtual whiteboard during a video conference controlled by a host device, the whiteboard including a first page configured to output first visual content and a second page configured to output second visual content to displays of participant devices connected to the video conference; and moving the first page to a first breakout room associated with the video conference and the second page to a second breakout room associated with the video conference, wherein access to the first page within the first breakout room is limited to a first group of one or more of the participant devices connected to the first breakout room and the host device, and wherein access to the second page within the second breakout room is limited to a second group of one or more of the participant devices connected to the second breakout room and the host device. In some implementations, the method includes populating at least one of the first page with the first visual content or the second page with the second visual content before the video conference begins. In some implementations, after the first page is moved to the first breakout room and the second page is moved to the second breakout room, the host device is configured to access the first page within the video conference without connecting to the first breakout room and access the second page within the video conference without connecting to the second breakout room. In some implementations, the method includes assigning, based on input from the host device, the first page to the first breakout room and the second page to the second breakout room. In some implementations, the method includes assigning the first page to the first breakout room based on a first label corresponding to the first page and assigning the second page to the second breakout room based on a second label corresponding to the second page. In some implementations, the method includes ending the first breakout room and the second breakout room; and combining the first page from the first breakout room with the second page from the second breakout room. In some implementations, access to the first page by the first group is limited to view access, and the method includes granting edit access to a sub-host device in the first group, wherein the edit access enables the sub-host device to change the first visual content. In some implementations, the method includes instantiating a third page of the whiteboard in at least one of the first breakout room or the second breakout room; and transmitting a notification to the host device indicating instantiation of the third page.

Some implementations may include an apparatus that includes a memory; and a processor configured to execute instructions stored in the memory to: instantiate a virtual whiteboard during a video conference controlled by a host device, the whiteboard including a first page configured to output first visual content and a second page configured to output second visual content to displays of participant devices connected to the video conference; and move the first page to a first breakout room associated with the video conference and the second page to a second breakout room associated with the video conference, wherein access to the first page within the first breakout room is limited to a first group of one or more of the participant devices connected to the first breakout room and the host device, and wherein access to the second page within the second breakout room is limited to a second group of one or more of the participant devices connected to the second breakout room and the host device. In some implementations, the processor is further configured to execute instructions stored in the memory to receive at least one of the first page populated with the first visual content or the second page populated with the second visual content before the video conference begins. In some implementations, the processor is further configured to execute instructions stored in the memory to enable the host device to access the first page while connected to a main meeting room of the video conference without the host device connecting to the first breakout room. In some implementations, the processor is further configured to execute instructions stored in the memory to assign, randomly, the first page to the first breakout room and the second page to the second breakout room. In some implementations, the processor is further configured to execute instructions stored in the memory to move the first page from the first breakout room and the second page from the second breakout room to a main meeting room of the video conference. In some implementations, the processor is further configured to execute instructions stored in the memory to grant edit access to a first participant device in the first group for editing the first page and view access to other participant devices in the first group to limit the other participant devices to viewing. In some implementations, the processor is further configured to execute instructions stored in the memory to transmit a notification to the host device indicating at least one of viewing or editing of the first page in the first breakout room.

Some implementations may include a non-transitory computer readable medium storing instructions operable to cause one or more processors to perform operations that include: instantiating a virtual whiteboard during a video conference controlled by a host device, the whiteboard including a first page configured to output first visual content and a second page configured to output second visual content to displays of participant devices connected to the video conference; and moving the first page to a first breakout room associated with the video conference and the second page to a second breakout room associated with the video conference, wherein access to the first page within the first breakout room is limited to a first group of one or more of the participant devices connected to the first breakout room and the host device, and wherein access to the second page within the second breakout room is limited to a second group of one or more of the participant devices connected to the second breakout room and the host device. In some implementations, the operations include moving, by the host device, the first page to the second breakout room and the second page to the first breakout room. In some implementations, the operations include generating a third page in a main meeting room of the video conference; and moving the third page to the at least one of the first breakout room or the second breakout room. In some implementations, the operations include enabling the host device to edit the first page in the first breakout room while the host device is connected to a main meeting room of the video conference. In some implementations, the operations include enabling the host device, from a main meeting room of the video conference, to view one or more edits to the first page in the first breakout room and view one or more edits to the second page in the second breakout room without the host device connecting to the first breakout room or the second breakout room.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    instantiating a virtual whiteboard during a video conference controlled by a host device, the virtual whiteboard including a first page configured to output first visual content and a second page configured to output second visual content to displays of participant devices connected to the video conference;
moving the first page to a first breakout room associated with the video conference and the second page to a second breakout room associated with the video conference, wherein access to the first page within the first breakout room is limited to a first group of one or more of the participant devices connected to the first breakout room and the host device, and wherein access to the second page within the second breakout room is limited to a second group of one or more of the participant devices connected to the second breakout room and the host device;
linking the first page individually with a first group of participants and linking the second page individually with a second group of participants, and moving the first page with the first group of participants individually and moving the second page with the second group of participants individually;
ending the first breakout room and the second breakout room;
combining the first page from the first breakout room with the second page from the second breakout room to form combined pages after the first breakout room and second breakout room are ended; and
propagating the combined pages to the virtual whiteboard in a main meeting room so that the combined pages are displayed to all of the participant devices connected to the video conference, wherein at least some of the participant devices are located remote from other of the participant devices.

2. The method of claim 1, further comprising:
populating at least one of the first page with the first visual content or the second page with the second visual content before the video conference begins.

3. The method of claim 1, wherein, after the first page is moved to the first breakout room and the second page is moved to the second breakout room, the host device is configured to access the first page within the video conference without connecting to the first breakout room and access the second page within the video conference without connecting to the second breakout room.

4. The method of claim 1, further comprising:
assigning, based on input from the host device, the first page to the first breakout room and the second page to the second breakout room.

5. The method of claim 1, further comprising:
assigning the first page to the first breakout room based on a first label corresponding to the first page and assigning the second page to the second breakout room based on a second label corresponding to the second page.

6. The method of claim 1, wherein access to the first page by the first group is limited to view access, the method further comprising:
granting edit access to a sub-host device in the first group, wherein the edit access enables the sub-host device to change the first visual content.

7. The method of claim 1, further comprising:
instantiating a third page of the virtual whiteboard in at least one of the first breakout room or the second breakout room; and
transmitting a notification to the host device indicating instantiation of the third page.

8. The method of claim 1, further comprising:
linking additional pages individually to the first group of participants or the second group of participants based upon identifiers assigned to the additional pages, and generating sub-whiteboards with the additional pages.

9. An apparatus, comprising:
a memory; and
a processor configured to execute instructions stored in the memory to:
instantiate a virtual whiteboard during a video conference controlled by a host device, the virtual whiteboard including a first page configured to output first visual content and a second page configured to output second visual content to displays of participant devices connected to the video conference;
move the first page to a first breakout room associated with the video conference and the second page to a second breakout room associated with the video conference, wherein access to the first page within the first breakout room is limited to a first group of one or more of the participant devices connected to the first breakout room and the host device, and wherein access to the second page within the second breakout room is limited to a second group of one or more of the participant devices connected to the second breakout room and the host device;
link the first page individually with a first group of participants and link the second page individually with a second group of participants, and move the first page with the first group of participants individually and move the second page with the second group of participants individually;
end the first breakout room and the second breakout room;
combine the first page from the first breakout room with the second page from the second breakout room to form combined pages after the first breakout room and second breakout room are ended; and
propagate the combined pages to the virtual whiteboard in a main meeting room so that the combined pages are displayed to all of the participate devices connected to the video conference, wherein one or more of the participant devices are located remote from other of the participant devices.

10. The apparatus of claim 9, wherein the processor is further configured to execute instructions stored in the memory to:
receive at least one of the first page populated with the first visual content or the second page populated with the second visual content before the video conference begins.

11. The apparatus of claim 9, wherein the processor is further configured to execute instructions stored in the memory to:
enable the host device to access the first page while connected to the main meeting room of the video conference without the host device connecting to the first breakout room.

12. The apparatus of claim 9, wherein the processor is further configured to execute instructions stored in the memory to:
move the first page from the first breakout room and the second page from the second breakout room to the main meeting room of the video conference.

13. The apparatus of claim 9, wherein the processor is further configured to execute instructions stored in the memory to:
grant edit access to a first participant device in the first group for editing the first page and view access to other participant devices in the first group to limit the other participant devices to viewing.

14. The apparatus of claim 9, wherein the processor is further configured to execute instructions stored in the memory to:
   transmit a notification to the host device indicating at least one of viewing or editing of the first page in the first breakout room.

15. The apparatus of claim 9, further comprising:
   linking additional pages individually to the first group of participants or the second group of participants based upon identifiers assigned to the additional pages, and
   generating sub-whiteboards with the additional pages.

16. A non-transitory computer readable medium storing instructions operable to cause one or more processors to perform operations comprising:
   instantiating a virtual whiteboard during a video conference controlled by a host device, the virtual whiteboard including a first page configured to output first visual content and a second page configured to output second visual content to displays of participant devices connected to the video conference;
   moving the first page to a first breakout room associated with the video conference and the second page to a second breakout room associated with the video conference, wherein access to the first page within the first breakout room is limited to a first group of one or more of the participant devices connected to the first breakout room and the host device, and wherein access to the second page within the second breakout room is limited to a second group of one or more of the participant devices connected to the second breakout room and the host device;
   linking the first page individually with a first group of participants and linking the second page individually with a second group of participants, and moving the first page with the first group of participants individually and moving the second page with the second group of participants individually;
   ending the first breakout room and the second breakout room;
   combining the first page from the first breakout room with the second page from the second breakout room to form combined pages after the first breakout room and second breakout room are ended; and
   propagating the combined pages to virtual whiteboard in a main meeting room so that the combined pages are displayed to all of the participant devices connected to the video conference, wherein one or more of the participant devices are located remote from other of the participant devices.

17. The non-transitory computer readable medium storing instructions of claim 16, the operations further comprising:
   moving, by the host device, the first page to the second breakout room and the second page to the first breakout room.

18. The non-transitory computer readable medium storing instructions of claim 16, the operations further comprising:
   generating a third page in the main meeting room of the video conference; and
   moving the third page to the at least one of the first breakout room or the second breakout room.

19. The non-transitory computer readable medium storing instructions of claim 16, the operations further comprising:
   enabling the host device to edit the first page in the first breakout room while the host device is connected to the main meeting room of the video conference.

20. The non-transitory computer readable medium storing instructions of claim 16, the operations further comprising:
   enabling the host device, from the main meeting room of the video conference, to view one or more edits to the first page in the first breakout room and view one or more edits to the second page in the second breakout room without the host device connecting to the first breakout room or the second breakout room.

* * * * *